J. GRUBE.
Grain-Separator.
No. 225,367. Patented Mar. 9, 1880.
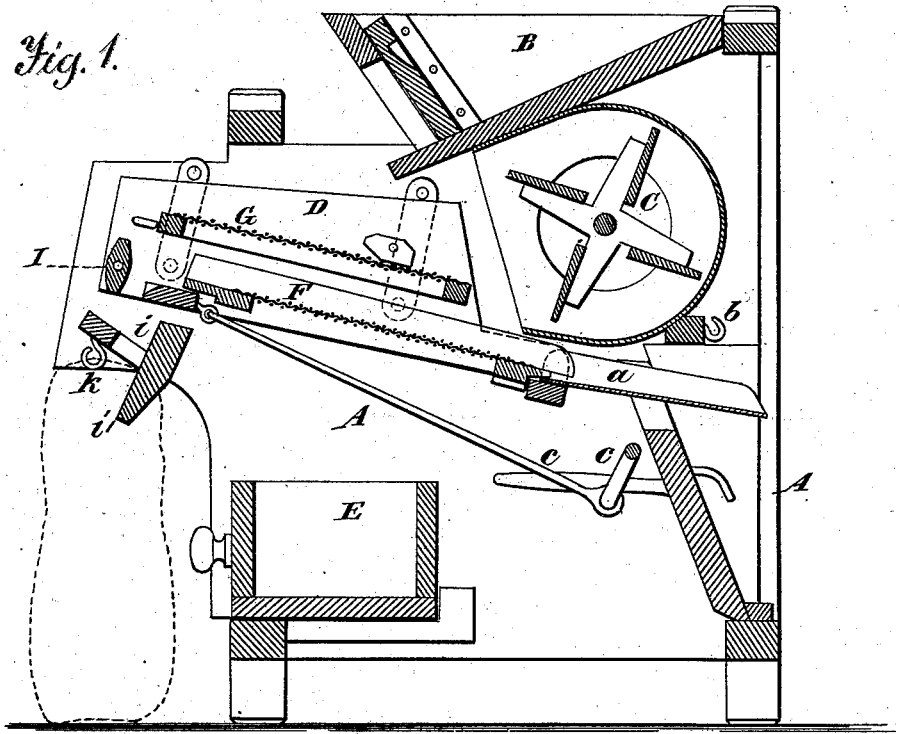
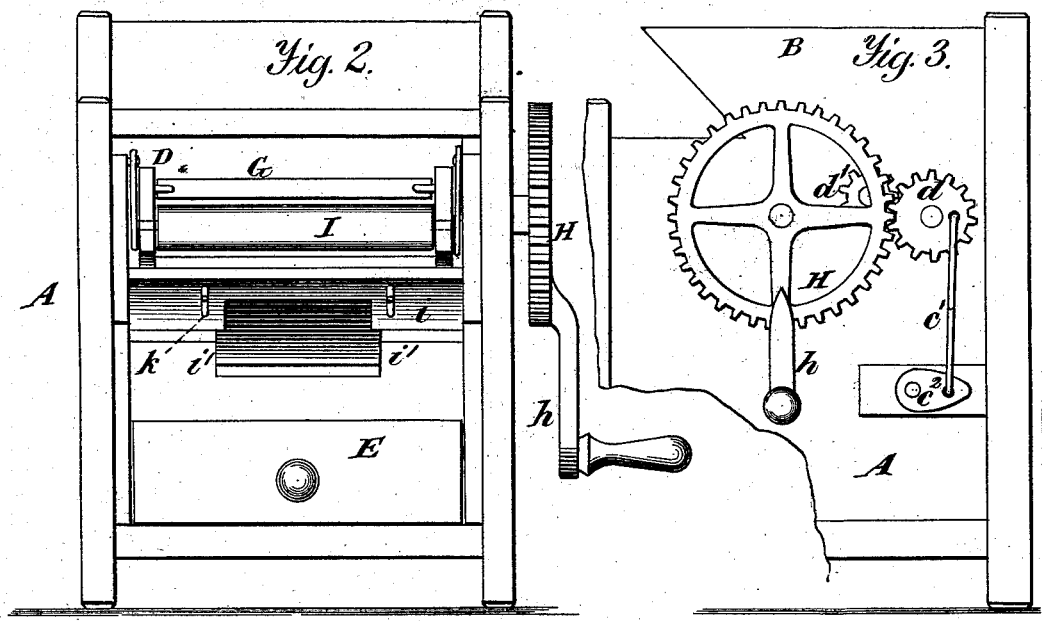

UNITED STATES PATENT OFFICE.

JEFFERSON GRUBE, OF AUBURN, INDIANA.

GRAIN-SEPARATOR.

SPECIFICATION forming part of Letters Patent No. 225,367, dated March 9, 1880.

Application filed May 2, 1879.

*To all whom it may concern:*

Be it known that I, JEFFERSON GRUBE, of Auburn, in the county of De Kalb and State of Indiana, have invented certain new and useful Improvements in Grain-Separators; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a vertical longitudinal section of my improved grain-separator. Fig. 2 is a rear elevation of the same, and Fig. 3 a detail view.

This invention has relation to machines for separating grain, seed, and chaff each from the others, adapted to employ the same high blast for each separation, and to conduct the grain and seed to opposite ends of the machine, whence they are conducted by proper chutes into bags held in position by the machine itself or portions thereof.

In carrying out my invention I arrange all the screens or shakers declining toward the fan end of the machine, to allow the heavy grain to gravitate thereto against the force of the blast, and said blast operates to force the seed and chaff up the incline of the shakers.

At the blast-exit end of the machine I provide a tail-board or seed-abutment, pivoted to the shoe at or near the center, and susceptible of adjustment at any desired angle. The seed and chaff passing out by the force of the blast are checked in their course by this tail-board. The chaff passes over and away, while the seed gravitates upon a proper double incline, and thence through an orifice into a receptacle partly held in position by the said inclines. In this construction and arrangement rests my invention.

In the accompanying drawings, A marks the casing, B the hopper, C the fan, and D the shoe, of the separator, all of the usual construction, while under the shoe is supported, upon cleats fastened to the inner sides of the casing, a box or draw, E.

The shoe D is provided with riddles or sieves F G, with different-sized meshes, the lower one being adapted to have an independent motion, or an opposite one to that of the shoe, and passing its grain off upon an inclined spout or chute, $a$, from which the grain may be received into sacks or bags, whose mouths are held open and in position to receive the grain by means of the oppositely-pointed hooks $b$, fastened to the casing A. If desired, the grain may pass off on the floor. The upper riddle or sieve, G, having the same inclination as the riddle F, will pass off its grain upon the same chute or spout $a$.

The fan is operated by the usual vibrating shaft $c$, connecting with a cam-action arm, $c'$, attached to a crank-bar, $c^2$, which is eccentrically connected to a pinion, $d$, gearing with a second pinion, $d'$, driven by a large toothed or gear wheel, H, with a handle, $h$.

I is a tail-board hung or pivoted in the upper or rear end of the shoe D, so as to permit the changing of the angle of deflection of the striking seed forced against the tail-board by the blast, the chaff being blown over the tail-board. The deflected seed will pass down upon an inclined board, $i$, affixed to the rear end of the case, and through an opening in this board into a sack or receptacle, with its mouth held open by a pendant, $i'$, and hooks $k$, fastened to said board. This deflector or tail-board prevents the blast carrying off the seed with the chaff, &c., and permits the subjecting of the grain and seed to the same or a strong unabated blast to thoroughly clean the grain, &c., without danger of carrying off the seed with the grain.

The adjustable pivoted abutting-plate I, in combination with the shakers and inclines, constitutes the gist of this invention.

In cases where the grain is mixed with the heavier seeds, as of clover, timothy, and the like, the incline of the said abutter may be easy, as the gravity of the grain materially assists its separation from the chaff, while in lighter seeds the incline must be more abrupt. This adjustment is readily made at will, and serves efficiently for the purpose described.

Having thus fully described my invention, I claim and desire to secure by Letters Patent—

In a grain-separator, the combination of the inclined shakers F G D, fan C, incline $i$, and inclined pendant $i'$ with the adjustable pivoted plate I, mounted in the shaker-frame, as and for the purposes set forth.

In testimony that I claim the foregoing as my own I affix my signature in presence of two witnesses.

JEFFERSON GRUBE.

Witnesses:
ALBERT ROBBINS,
ROBERT McDOUGALL.